(12) United States Patent
Kitamura

(10) Patent No.: US 7,068,403 B2
(45) Date of Patent: Jun. 27, 2006

(54) COMPUTER-GENERATED HOLOGRAM

(75) Inventor: Mitsuru Kitamura, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 10/776,638

(22) Filed: Feb. 12, 2004

(65) Prior Publication Data
US 2004/0240007 A1 Dec. 2, 2004

(30) Foreign Application Priority Data
Feb. 12, 2003 (JP) .............................. 2003-034000

(51) Int. Cl.
*G03H 1/08* (2006.01)

(52) U.S. Cl. .............................. 359/9; 359/23; 359/32

(58) Field of Classification Search .................... 359/9, 359/32, 33, 23; 382/210
See application file for complete search history.

(56) References Cited

U.S. PATENT DOCUMENTS
5,475,511 A * 12/1995 Haines et al. .................. 359/9

FOREIGN PATENT DOCUMENTS

| EP | 1184747 A2 | 3/2002 |
|---|---|---|
| JP | 11-202741 * | 7/1999 |
| JP | 11-202741 A | 7/1999 |
| JP | 2001-100622 A | 4/2001 |
| WO | WO 02/39193 A1 | 5/2002 |

* cited by examiner

*Primary Examiner*—Leonidas Boutsikaris
(74) *Attorney, Agent, or Firm*—Sughrue Mion, PLLC

(57) ABSTRACT

A computer-generated hologram comprising a plurality of cells. The hologram has information recorded therein, the information operable to recreate a stereoscopic image of an object. At least one of said plurality of cells $P_j$ has information related to a luminance TWLci ($^\theta XY$, $^\theta YZ$) of a virtual point light source $Q_i$ from a plurality of virtual point light sources. The luminance corresponds to a point S on the object. The point S is on a straight line between said one of the plurality of cells $P_j$ and the virtual point light source $Q_i$.

14 Claims, 6 Drawing Sheets

COMPUTER-GENERATED HOLOGRAM

BACKGROUND OF THE INVENTION

The present invention relates generally to a computer-generated hologram, and more particularly to a computer-generated hologram that is relatively simple to fabricate and serves well to reconstruct a three-dimensional image of high quality at high resolution.

Holography has been developed as one of long-standing desires to record three-dimensional images on planes. Holography is a sort of technology for recording 3D image of an object making use of a laser light source of high coherence, and a 3D image display medium fabricated by holography is called a hologram. Holograms have such difficulties that they can never be fabricated unless the object to be recorded is substantially present, because they are actually produced by a process wherein laser light is directed to the object for recording its image in a photosensitive material. In addition, the object must be kept still at the wavelength level of light during recording, and so it is difficult to record objects often in motion such as flexible objects and figures. On the other hand, there is a stereogram that makes a number of two-dimensional images created by still cameras, video cameras, computer graphics (CG), etc. stereoscopically visible. The stereogram, by definition, is a medium that makes it possible for a viewer to see an image that varies with viewing directions. Given a parallax image of an object viewed from a plurality of directions, three-dimensional effects are obtainable because the image of the object can be seen depending on viewing directions.

Now widely used is a stereogram obtained with a lens array such as a lenticular or fly's eye lens located on a printing medium. The stereogram may also be fabricated by means of holography, and is called a holographic stereogram. The holographic stereogram developed to date is roughly broken down to two types, one called a two-step holographic stereogram and the other a one-step holographic stereogram after the number of recording photosteps.

The two-step holographic stereogram, true to its name, is fabricated by a two-photostep process, whose details are set forth in Patent Publication 1. Briefly speaking, the two-photostep process comprises three steps, i.e., a step (1) of providing two-dimensional images of the object to be recorded, which are viewed from a number of positions spaced away from it, a photostep (2) of dividing a first photosensitive material into a number of areas, wherein an image corresponding to a specific area of the areas provided in step (1) is holographically recorded in that area thereby preparing a first hologram, and a photostep (3) of directing reconstructing illumination light to the first hologram so that the reconstructed image is recorded in a second photosensitive material to prepare a second hologram. On the other hand, the one-step holographic stereogram, as its name implies, is fabricated by a one-photostep process, whose details are set forth in Patent Publications 2 and 3. Briefly speaking, this process comprises a step (1) of finding light rays to be radiated from a number of positions on a photosensitive material, and a photostep (2) of dividing the photosensitive material into a number of areas, wherein the light ray to be reconstructed from a specific area of the areas found in step (1) is recorded in that specific area.

Whether the two-step holographic stereogram or the one-step holographic stereogram makes it possible for the viewer to see a three-dimensional image, and so is now used as a general-purpose medium for the reconstruction of 3D images.

For the hologram that can reconstruct 3D images, there is also known a 3D image reconstructing computer-generated hologram (CGH) proposed by the inventors (see Patent Publications 4, 5, 6 and 7). In this CGH, the surface of the object is replaced by a set of point or line light sources for calculation of phases and amplitudes on the hologram plane.

For the CGH obtained by the process wherein the surface of the object is replaced by a set of point or line light sources, it is also proposed to reproduce images in color upon reconstruction by white light, as set forth in Patent Publication 8.

Patent Publication 1
JP-A 52-4855
Patent Publication 2
U.S. Pat. No. 2,884,646
Patent Publication 3
JP-A 6-266274
Patent Publication 4
JP-A 9-319290
Patent Publication 5
JP-A 11-202741
Patent Publication 6
JP-A 2001-13858
Patent Publication 7
JP-A 2001-13859
Patent Publication 8
JP-A 2000-214751
Patent Publication 9
JP-A 2002-72837
Non-Patent Publication 1
Junpei Tsuji, "Selection of Physics, Holography", published by Shokabo Co., Ltd. (Nov. 5, 1997), pp. 33–36.

The aforesaid prior art 3D image reconstruction processes have their own merits and demerits. Print with a lens array such as a lenticular or fly's eye lens has a merit of dispensing with any holographic photostep relying upon laser light, but it has several demerits of decreased resolution and increased thickness due to the need of a physical pixel structure such as a lens array.

The two-step holographic stereogram comprises a pixel structure-free hologram plane and so has high resolution; however, it has problems in that some holographic photosteps are required with distortion in images.

The one-step holographic stereogram has no image distortion yet with more parallaxes; however, its problems are that the pixel structure is noticeable on the hologram plane and some considerable holographic photosteps result in the need of special image processing.

The three-dimensional image reconstruction CGH proposed by the inventors has several merits of higher resolution, more parallaxes, no image distortion and no need of using any holographic photostep, but there are elusive problems in that some special image processing operations (such as hidden surface removal and correction of luminance) are necessary.

SUMMARY OF THE INVENTION

A primary object of the invention is to provide a solution to the demerits of each of the above prior arts by the provision of a computer-generated hologram, which has ever higher resolution, much more parallaxes and no image distortion problem, and which makes any holographic photoset unnecessary and image processing easy.

According to one aspect of the invention, the above object is accomplished by the provision of computer-generated hologram with a complex amplitude of object light recorded therein so that a stereoscopic object is reconstructible, characterized in that:

a group of virtual point light sources is spatially set on a side opposite to a viewing side of the hologram, a luminance angle distribution $T_{WLci}$ ($\theta_{xz}$, $\theta_{yz}$) of divergent light from each virtual point light source in said group of virtual point light sources toward said viewing side is set in such a way as to be equal to a luminance angle distribution on a surface of an object to be recorded as said virtual point light source is viewed from the viewing side, and an initial phase of divergent light diverging from each of said virtual point light sources is kept constant independently among said virtual point light sources, so that divergent light beams from said virtual point light sources are superposed one upon another and recorded as object light in any position on a viewing side of said group of virtual point light sources, on which the divergent light is incident.

In this aspect of the invention, each virtual point light source in said group of virtual point light sources may comprise a one-dimensional point light source that is also a two-dimensional straight line light source.

Preferably in the first aspect of the invention, the initial phase of the divergent light diverging from each virtual point light source in the virtual point light source group is mutually independently determined, because the amplitude distribution of object waves by the synthesis of light from all light sources is averaged and so unnecessary noises are substantially removed from a reconstructed image.

According to another aspect of the invention, there is provided a computer-generated hologram with a complex amplitude of object light recorded therein so that a stereoscopic object is reconstructible, characterized in that:

upon incidence of given reconstructing illumination light thereon, there is reconstructed diffraction light that diverges from each point in a spatial group of virtual points toward a viewing side of a hologram wherein said spatial group of virtual points is located on a side opposite to the viewing side, and wherein a luminance angle distribution of light propagating in such a way as to diverge from each virtual point toward the viewing side of the hologram is equal to a luminance angle distribution of light that diverges from a surface of a recorded object to a viewing side thereof via each point in said group of virtual points.

In this aspect of the invention, each virtual point in said group of virtual points may comprise a one-dimensional point that is also two-dimensional straight line.

According to yet another aspect of the invention, there is provided a computer-generated hologram with a complex amplitude of object light recorded therein so that a stereoscopic object is reconstructible, characterized in that:

a group of virtual condensing points is spatially set on a viewing side of a hologram, an luminance angle distribution $T_{WLci}$ ($\theta_{xz}$, $\theta_{yz}$) of convergent light incident on each condensing point in said group of virtual condensing points from a side opposite to the viewing side is set in such a way as to be equal to a luminance angle distribution on a surface of an object to be recorded as viewed for the viewing side through said virtual condensing point, and a phase of convergent light incident on each condensing point in said group of virtual condensing points is kept constant independently among said virtual condensing points, so that convergent light beams are superposed one upon another and recorded as object light in any position on a side opposite to a viewing side of said group of virtual condensing points, on which convergent light is incident.

In this aspect of the invention, each virtual condensing point in said group of virtual condensing points may comprise a one-dimensional condensing point that is also a two-dimensional condensing straight line.

Preferably in the third aspect of the invention, the initial phase of the converging light incident on each virtual condensing point in the virtual condensing point group is mutually independently determined, because the amplitude distribution of object waves by the synthesis of light all condensing points is averaged and so unnecessary noises are substantially removed from a reconstructed image.

According to the fourth aspect of the invention, there is provided a computer-generated hologram with a complex amplitude of object light recorded therein so that a stereoscopic object is reconstructible, characterized in that:

upon incidence of given reconstructing illumination light thereon, there is reconstructed diffraction light that diverges from each point in a spatial group of virtual points on a viewing side of a hologram, wherein a luminance angle distribution of light diverging from each virtual point is equal to a luminance angle distribution of light diverging from a surface of a recorded object on a viewing side thereof through each point in said group of virtual points.

In this aspect of the invention, each virtual point in said group of virtual points may comprise a one-dimensional point that is also a two-dimensional straight line.

In accordance with the computer-generated hologram of the invention, the position of condensing reconstruction light diffracted from the hologram is separated from the object to be reconstructed and the hologram plane. It is thus possible to achieve a computer-generated hologram that has no pixel structure on the hologram plane with much more parallaxes and ever higher resolution, creating a reconstructed image having no image distortion problem and much higher quality. It is also possible to provide a computer-generated hologram that makes any holographic photostep unnecessary, ensures simplified image processing, and makes a computer graphic image of a three-dimensional object obtained on commercial software available as the stereoscopic image to be recorded.

Still other objects and advantages of the invention will in part be obvious and will in part be apparent from the specification.

The invention accordingly comprises the features of construction, combinations of elements, and arrangement of parts, which will be exemplified in the construction hereinafter set forth, and the scope of the invention will be indicated in the claims.

DESCRIPTION OF THE PREFERRED EMBODIMENTS

In accordance with the rudimental principles of the computer-generated hologram of the invention, used to deprive a pixel structure of a hologram plane, at a position spaced away from the hologram plane there are defined a multiplicity of virtual point light sources having a radiance that varies with a radiation direction and is equal to the radiance of an object surface in that direction or a multiplicity of virtual condensing points having a radiance that varies with a condensing direction and is equal to the radiance of an object surface in that direction, so that a computer-generated hologram is fabricated by using light that radiates from those virtual point light sources or condenses onto those virtual condensing points as virtual object light, thereby obtaining a computer-generated hologram (CGH) that has higher resolution and can dispense with any holographic photostep.

The principles of the computer-genreated hologram according to the invention are now explained.

Figure 1:
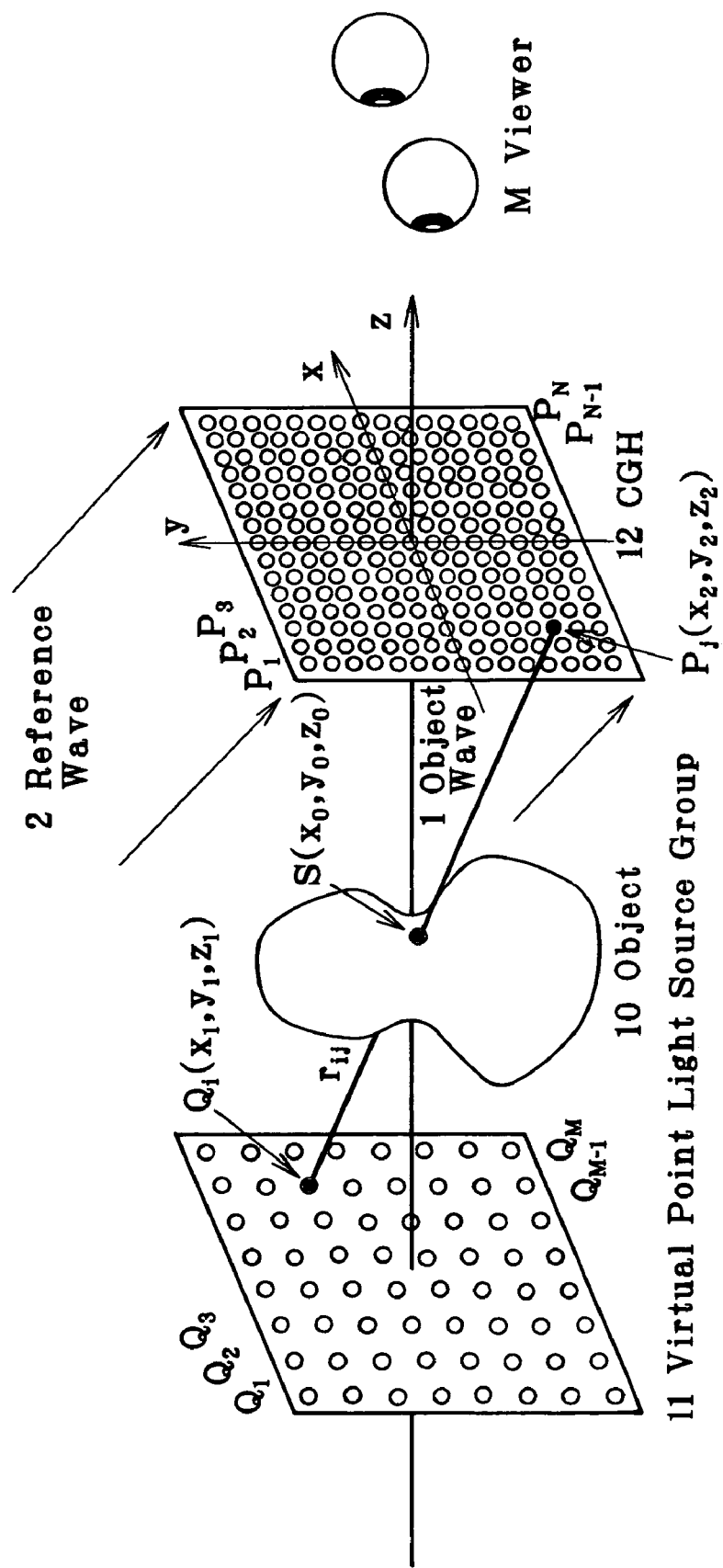
FIG. 1 is illustrative of the principles of the computer-generated hologram according to the invention.

As shown in FIG. 1 illustrative of the principles of the invention, a group 11 of virtual point light sources, an object 10, a CGH 12 and a viewer M are located in this order along a + direction along a z-axis. With the center of CGH 12 defining the origin of coordinates, x- and y-axes are determined in mutually orthogonal directions and in a direction orthogonal with respect to the z-axis. With the coordinates of virtual point light source group 11 described in terms of $(x_1, y_1, z_1)$, the coordinates of object 10 in terms of $(x_0, y_0, z_0)$ and the coordinates of CGH 12 in terms of $(x_2, y_2, z_2)$, the radiance of object 10 in $\theta_{xz}$ and $\theta_{yz}$ directions at a point S $(x_0, y_0, z_0)$ that is observable from viewer M among the points of intersection of object 10 with a straight line $Q_iP_j$ connecting an i-th virtual point light source $Q_i$ $(x_1, y_1, z_1)$ with a j-th cell $P_j$ $(x_2, y_2, z_2)$ of CGH 12 is represented by $T_{WLci}(\theta_{xz}, \theta_{yz})$ Here $\theta_{xz}$ is an angle of straight light $Q_iP_j$ with the z-axis upon projected onto an x-z plane, and $\theta_{yz}$ is an angle of straight line $Q_iP_j$ with the z-axis upon projected onto a y-z plane.

Given that $\lambda_c$ is a wavelength, $A_{WLci}$ is the amplitude of wavelength $\lambda_c$ of virtual point light source $Q_i$, the initial phase is $\phi_{WLci}$, and $r_{ij}$ is the $Q_i$ to $P_j$ distance. Then, the complex amplitude value $O_{WLc}$ $(X_2, y_2, z_2)$ of an object wave 1 at $P_j$ $(x_2, y2, z_2)$ becomes $$O_{WLc}(x_2, y_2, z_2) = \sum_{i=1}^{M} \{A_{WLci} T_{WLci}(\theta_{xz}, \theta_{yz})/|r_{ij}|\} \times \exp[j\{(2\pi/\lambda_c)r_{ij} + \phi_{WLci}\}] \quad (1)$$

Here the incident vector of reference light 2 incident on CGH 12 and consisting of parallel light is given by $(R_x, R_y, R_z)$, the amplitude of wavelength $\lambda_c$ thereof by $R_{WLc0}$, and the phase thereof at the origin of the coordinates by $\phi_{RWLc}$. Then, the complex amplitude value of reference light 2 becomes $$R_{WLc}(x_2, y_2, z_2) = R_{WLc0} \cdot \exp[j\{2\pi/\lambda_c\} \times (R_x x_2 + R_y y_2 + R_z z_2)/(R_x^2 + R_y^2 + R_z^2)^{1/2} + \phi_{RWLc}\}] \quad (2)$$

The intensity value, $I_{WLc}$ $(X_2, y_2, Z_2)$, of interference fringes of object wave 1 and reference light 2 at $P_j$ $(x_2, y_2, z_2)$ is $$I_{WLc}(x_2, y_2, z_2) = |O_{WLc}(x_2, y_2, z_2) + R_{WLc}(x_2, y_2, z_2)|^2 \quad (3)$$

In the above equations, the $Q_i$ to $P_j$ distance $r_{ij}$ is $$R_{ij} = \{(x_2-x_1)^2 + (y_2-y_1)^2 + (z_2-z_1)^2\}^{1/2} \quad (4)$$

The angle $\theta_{xz}$ of straight line $Q_iP_j$ with the z-axis upon projected onto the x-z plane is $$\theta_{xz} = \tan^{-1}\{(x_2-x_1)/(z_2-z_1)\} \quad (5)$$

The angle $\theta_{yz}$ of straight line $Q_iP_j$ with the z-axis upon projected onto the y-z plane is $$\theta_{xz} = \tan^{-1}\{(y_2-y_1)/(z_2-z_1)\} \quad (6)$$

The initial phases $\phi_{WLci}$ of virtual point light sources $Q_i$ are mutually independently and constantly determined among them.

As can be seen from the foregoing, a number of virtual point light sources $Q_i$ $(x_1, y_1, z_1)$ are located on a side opposite to the viewing side of three-dimensional object 10 that can be recorded and reconstructed as CHG 12. The luminance angle distribution $T_{WLci}$ $(\theta_{xz}, \theta_{yz})$ of light divergent from each virtual point light source $Q_i$ is set in such a way as to become equal to that on the surface of that three-dimensional object 10 as the virtual point light source $Q_i$ is viewed from the viewing side through the three-dimensional object 10, and the initial phase $\phi_{WLci}$ of the virtual point light source $Q_i$ is mutually independently and constantly set among virtual point light sources $Q_i$. Divergent light beams from such virtual point light sources $Q_i$ are superimposed one upon another on the plane of CGH 12, and the ensuing superposed phase and amplitude are holographically recorded in a given position (by interference with reference light 2), thereby obtaining CGH 12 that can reconstruct the three-dimensional object 10.

In the arrangement of FIG. 1, it is noted that CGH 12 is not necessarily positioned on the viewing side of object 10; it could be located anywhere on the viewing side of virtual point light source group 11. It is also noted that the object 10 is not necessarily positioned on the viewing side of virtual point light source group 11.

Figure 2:
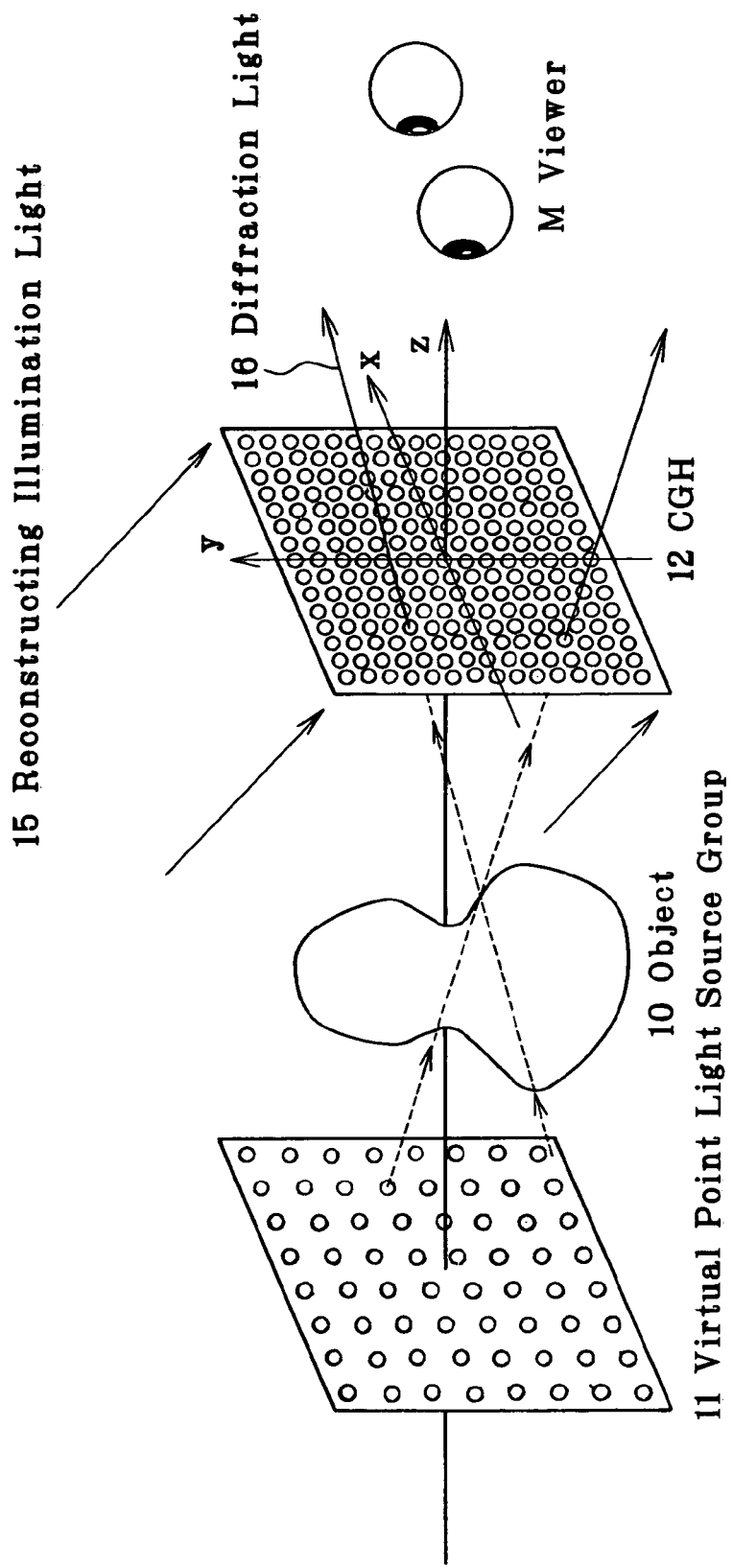
FIG. 2 is illustrative of how a stereoscopic image is reconstructed from the computer-generated hologram of FIG. 1.

As reconstructing illumination light 15 having the same wavelength $\lambda_c$ as that of reference light 2 is entered in the thus fabricated CGH 12 at the same angle of incidence as that of reference light 2 as shown in FIG. 2, the object (three-dimensional object) 10 is reconstructed as a virtual image (often as a real image depending on the position of CGH 12 relative to object 10) by diffraction light 16 diffracted from CGH 12, enabling viewer M to view that three-dimensional object 10. By movement of the point of view, the viewer will be capable of viewing the object 10 with satisfactory three-dimensional effects. It is here understood that although diffraction light 16 propagates as if it left virtual point light source group 11, yet that group 11 is hard to perceive directly because the light leaving each virtual point light source varies in luminance with directions.

Figure 3:
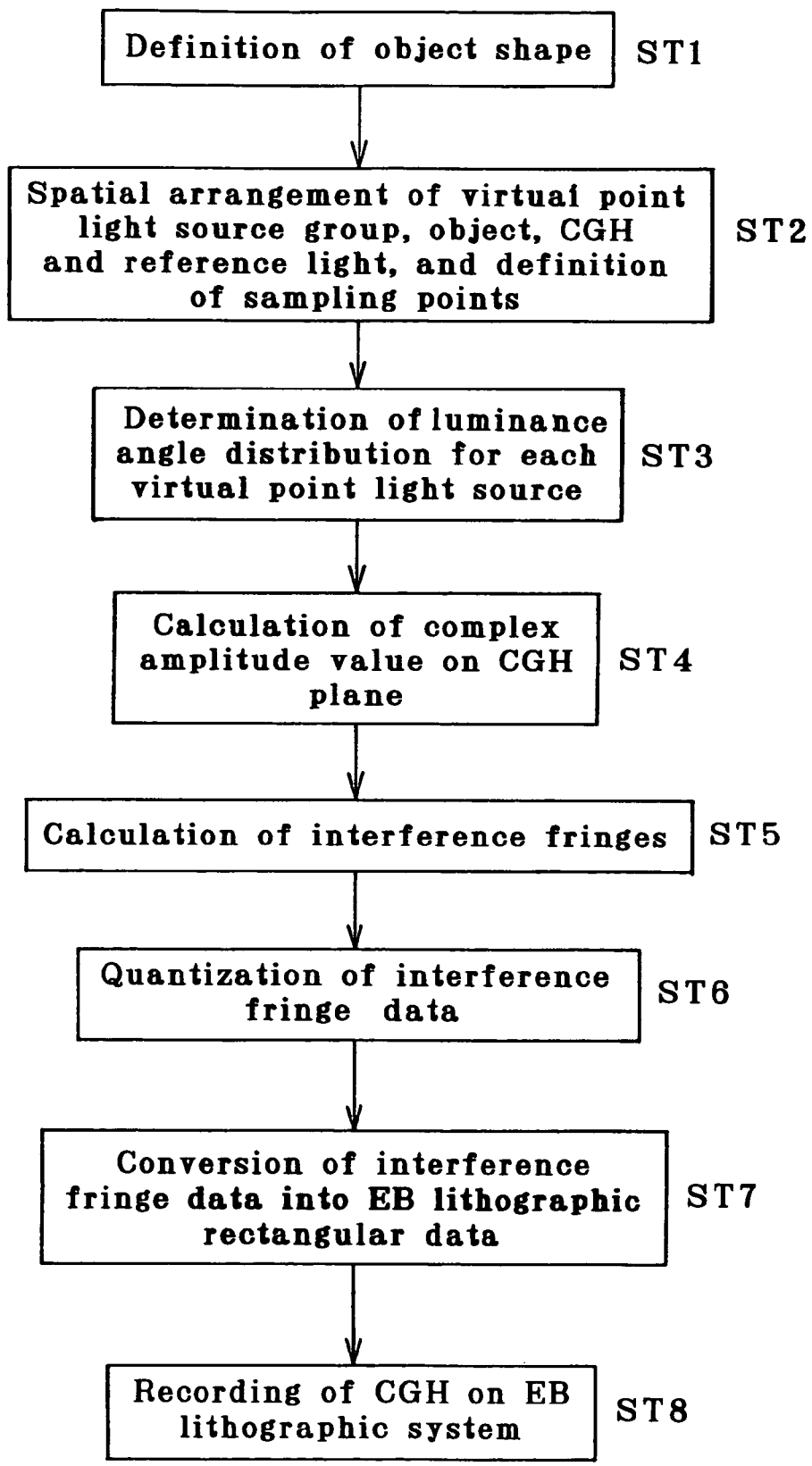
FIG. 3 is illustrative of how to fabricate the computer-generated hologram of FIG. 1.

How to fabricate such CGH 12 in the form of a binary hologram is now explained with reference to FIG. 3. At step ST1, the shape of the object 10 to be fabricated as a CGH is defined. Then, at step ST2, a spatial arrangement for a virtual point light source group 11, object 10, CGH 12 and reference light 2, a sampling point $(Q_i)$ for virtual point light source group 11 and a sampling point $(P_j)$ for CGH 12 are defined. Then, at step ST3, a luminance angle distribution $T_{WLci}$ $(\theta_{xz}, \theta_{yz})$ for each virtual point light source is set in such a way as to become equal to that on the surface of object 10. Then, at step ST4, the complex amplitude value $O_{WLc}$ ($x_2$, $y_2$, $z_2$) of object light and the complex amplitude value $R_{WLc}$ ($x_2$, $y_2$, $z_2$) of reference light 2 on the plane of CGH 12 are calculated from equations (1) and (2). Thereafter, at step ST5, the intensity of interference fringes of object light and reference light is found from equation (3) at each sampling point defined on the plane of CGH 12, so that interference fringe data are obtained. Following this, the obtained interference fringe data are quantized at step ST6 and then converted into EB lithographic rectangular data at step ST7, which are finally recorded in a medium on an EB lithography system, resulting in CGH 1.

While, in FIG. 1, object waves from all virtual point light sources $Q_i$ are shown as being incident on the cell $P_j$ of CGH 12, it is understood that the virtual point light source group 11 and CGH 12 could be divided to a number of slice planes vertical to the y-axis in such a way that the range of incidence of waves could be limited to within the slice planes.

In FIG. 1, while point light sources in a two-dimensional plane are used as the virtual point light sources, it is acceptable to employ line light sources emitting light that does not go as far as the y-direction.

In FIG. 1, the interference of object light and reference light is used so as to fix the complex amplitude value $O_{WLc}$ ($x_2$, $y_2$, $z_2$) as a hologram. However, it is acceptable to rely upon Lohmann's method and Lee's method (Non-Patent Publication 1) for direct reconstruction of the complex amplitudes of object waves, and the method proposed by the inventors in Patent Publication 9 as well.

Figure 4:
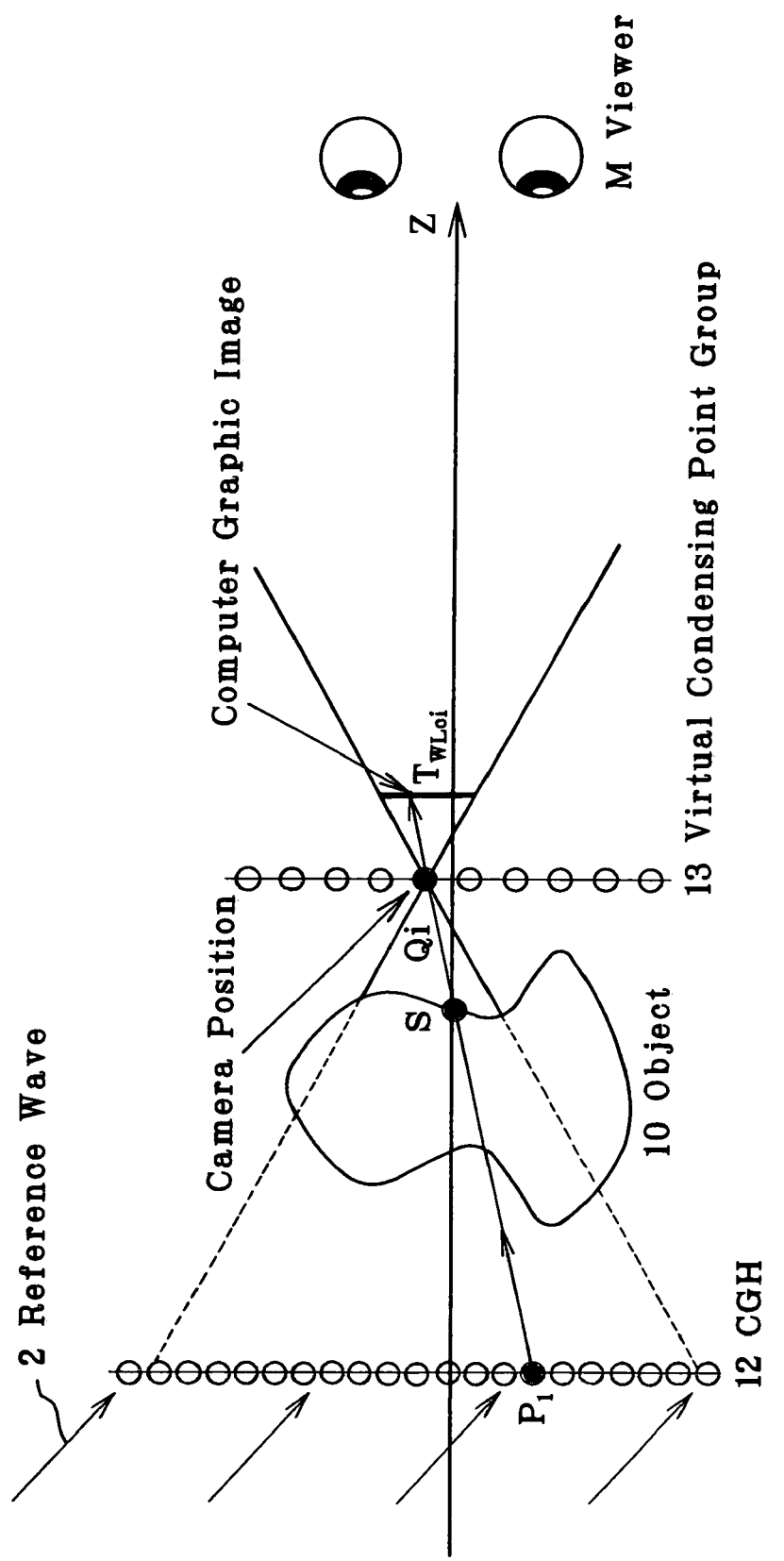
FIG. 4 is illustrative of another embodiment of the computer-generated hologram according to the invention.

FIG. 4 is illustrative of another embodiment of the computer-generated hologram according to the invention, wherein the virtual point light source group 11 and CGH 12 of FIG. 1 are interchanged and the virtual point light source group 11 is replaced by a virtual condensing point group 13. As shown in FIG. 4, CGH 12, an object 10, a virtual condensing point group 13 and a viewer M are located in this order in a + direction along a z-axis. With the center of CGH 12 defining the origin of coordinates, x- and y-axes are determined in mutually orthogonal directions and in a direction orthogonal with respect to the z-axis. With the coordinates of the group of virtual condensing point group 13 described in terms of ($x_1$, $y_1$, $z_1$), the coordinates of object 10 in terms of ($x_0$, $y_0$, $z_0$) and the coordinates of CGH 12 in terms of ($x_2$, $y_2$, $z_2$), the radiance of object 10 in $\theta_{xz}$ and $\theta_{yz}$ directions at a point S ($x_0$, $y_0$, $z_0$) that is observable from viewer M among the points of intersection of object 10 with a straight line $Q_iP_j$ connecting an i-th virtual condensing point $Q_i$ ($x_1$, $y_1$, $z_1$) with a j-th cell $P_j$ ($x_2$, $y_2$, $z_2$) of CGH 12 is represented by $T_{WLci}$ ($\theta_{xz}$, $\theta_{yz}$). Here $\theta_{xz}$ is an angle of straight light $Q_iP_j$ with the z-axis upon projected onto an x-z plane, and $\theta_{yz}$ is an angle of straight line $Q_iP_j$ with the z-axis upon projected onto a y-z plane.

Given that $\lambda_c$ is a wavelength, $\phi_{WLci}$ is the phase of wavelength $\lambda_c$ of virtual condensing point $Q_i$, and $r_{ij}$ is the $Q_i$ to $P_j$ distance. Then, the complex amplitude value $O_{WLc}$ ($x_2$, $y_2$, $z_2$) of an object wave incident on $P_j$ ($x_2$, $y_2$, $z_2$) becomes, rather than the aforesaid equation (1), $$O_{WLc}(x_2, y_2, z_2) = \sum_{i=1}^{M} \{T_{WLci}(\theta_{xz}, \theta_{yz})/|r_{ij}|\} \times \exp[j\{-(2\pi/\lambda_c)|r_{ij}| + \phi_{WLci}\}] \quad (1')$$

Here the incident vector of reference light 2 incident on CGH 12 and consisting of parallel light is given by ($R_x$, $R_y$, $R_z$), the amplitude of wavelength $\lambda_c$ thereof by $R_{WLc0}$, and the phase thereof at the origin of the coordinates by $\phi_{RWLc}$. Then, as is the case with FIG. 1, the complex amplitude value of reference light 2 becomes $$R_{WLc}(x_2, y_2, z_2) = R_{WLc0} \cdot \exp[j\{2\pi/\lambda_c\} \times \quad (2)$$
$$(R_x x_2 + R_y y_2 + R_z z_2)/(R_x^2 + R_y^2 + R_z^2)^{1/2} + \phi_{RWLc}\}]$$

Likewise, the intensity value, $I_{WLc}$ ($x_2$, $y_2$, $z_2$), of interference fringes of object wave and reference light 2 at $P_j$ ($x_2$, $y_2$, $z_2$) becomes $$I_{WLc}(x_2, y_2, z_2) = |O_{WLc}(x_2, y_2, z_2) + R_{WLc}(x_2, y_2, z_2)|^2 \quad (3)$$

In the above equations, the $Q_i$ to $P_j$ distance $r_{ij}$ is $$r_{ij} = \{(x_2-x_1)^2 + (y_2-y_1)^2 + (z_2-z_1)^2\}^{1/2} \quad (4)$$

The angle $\theta_{xz}$ of straight line $Q_iP_j$ with the z-axis upon projected onto the x-z plane is $$\theta_{xz} = \tan^{-1}\{(x_2-x_1)/(z_2-z_1)\} \quad (5)$$

The angle $\theta_{yz}$ of straight line $Q_iP_j$ with the z-axis upon projected onto the y-z plane is $$\theta_{xz} = \tan^{-1}\{(y_2-y_1)/(z_2-z_1)\} \quad (6)$$

The initial phase $\phi_{WLci}$ of each virtual condensing point $Q_i$ is mutually independently and constantly determined among virtual condensing points $Q_j$.

As can be seen from the foregoing, a number of virtual condensing points $Q_i$ ($x_1$, $y_1$, $z_1$) are located on the viewing side of three-dimensional object 10 that can be recorded and reconstructed as CGH 12. The luminance angle distribution $T_{WLci}$ ($\theta_{xz}$, $\theta_{yz}$) of convergent light incident from the object side on each virtual condensing point $Q_i$ is set in such a way as to become equal to that of the surface of that three-dimensional object 10 as the three-dimensional object 10 is viewed from the viewing side through the virtual condensing point $Q_i$, and the initial phase $\phi_{WLci}$ at the virtual condensing point $Q_i$ is mutually independently and constantly set among virtual condensing points $Q_i$. Convergent light beams on such virtual condensing points $Q_i$ are superimposed one upon another on the plane of CGH 12, and the ensuing superposed phase and amplitude are holographically recorded in a given position (by interference with reference light 2), thereby obtaining CGH 12 that can reconstruct the three-dimensional object 10.

In the arrangement of FIG. 4, it is noted that CGH 12 is not necessarily located on the side opposite to the viewing side of the object 10; it could be located anywhere on the side opposite to the viewing side of the virtual condensing point group 13. It is also noted that the object 10 is not necessarily positioned on the side opposite to the viewing side of the virtual condensing point group 13.

It is noted the luminance angle distribution $T_{WLci}$ ($\theta_{xz}$, $\theta_{yz}$) of convergent light from the object side on the above virtual condensing point $Q_i$ is the same as that for a computer graphic image generated with a computer graphic camera located at the position of virtual condensing point $Q_i$, as shown in FIG. 4, and so the calculation of equation (1') can be simplified because usuable to this end is a computer graphic image (3D CG image) generated using commercial software with the point of view placed on the virtual condensing point $Q_i$.

Figure 5:
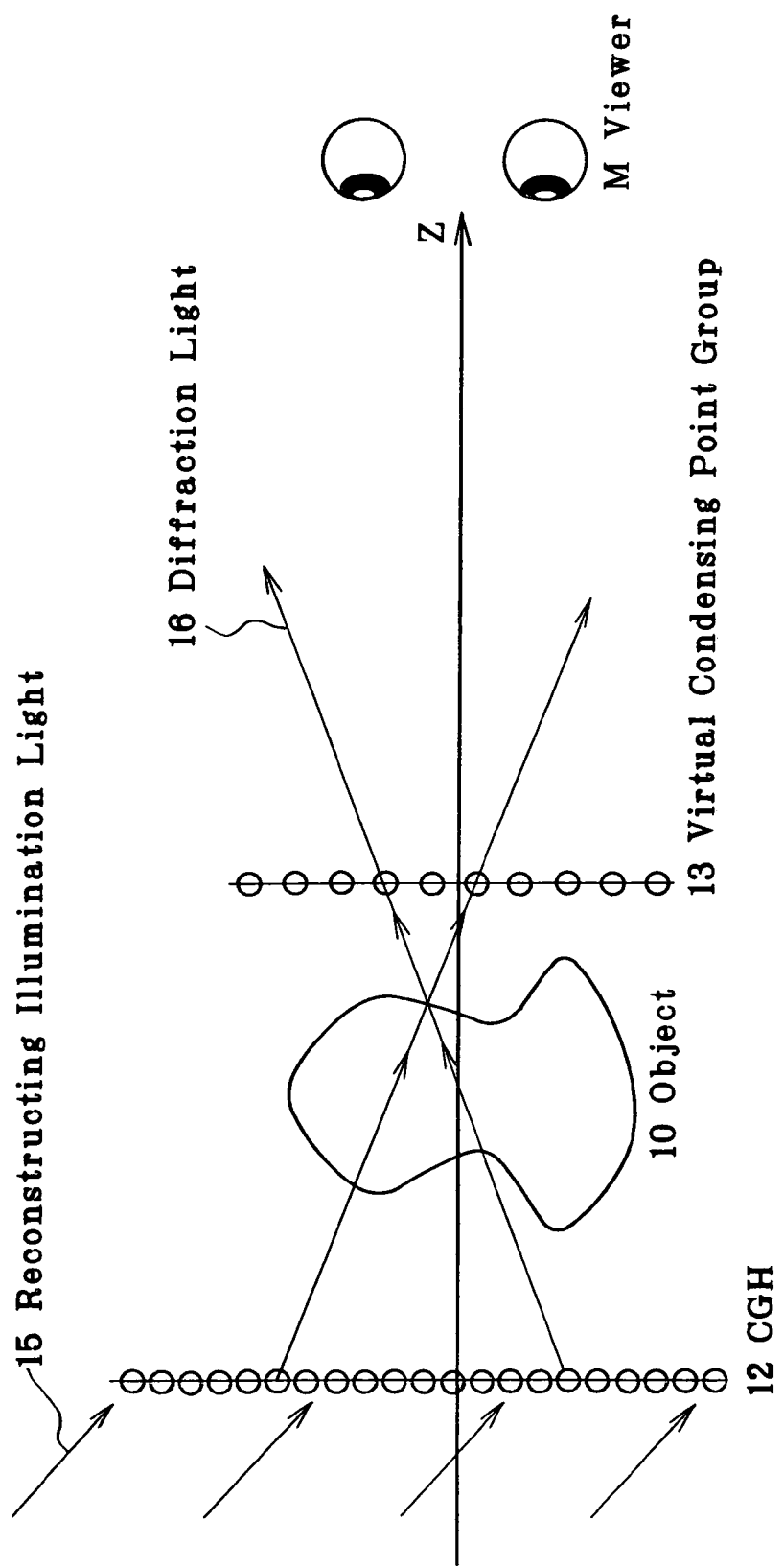
FIG. 5 is illustrative of how a stereoscopic image is reconstructed from the computer-generated hologram of FIG. 4.

As reconstructing illumination light 15 having the same wavelength $\lambda_c$ as that of reference light 2 is entered in the thus fabricated CGH 12 at the same angle of incidence as that of reference light 2 as shown in FIG. 5, the object (three-dimensional object) 10 is reconstructed as a real image (often as a virtual image depending on the position of CGH 12 relative to the object 10) by diffraction light 16 diffracted from CGH 12, enabling viewer M to view that three-dimensional object 10. By movement of the point of view, the viewer will be capable of viewing the object 10 with satisfactory three-dimensional effects. It is here understood that although diffraction light 16 propagates as if it left the virtual condensing point group 13, yet the virtual condensing point group 13 is hard to perceive directly because the light leaving each virtual condensing point varies in luminance with directions.

Figure 6:
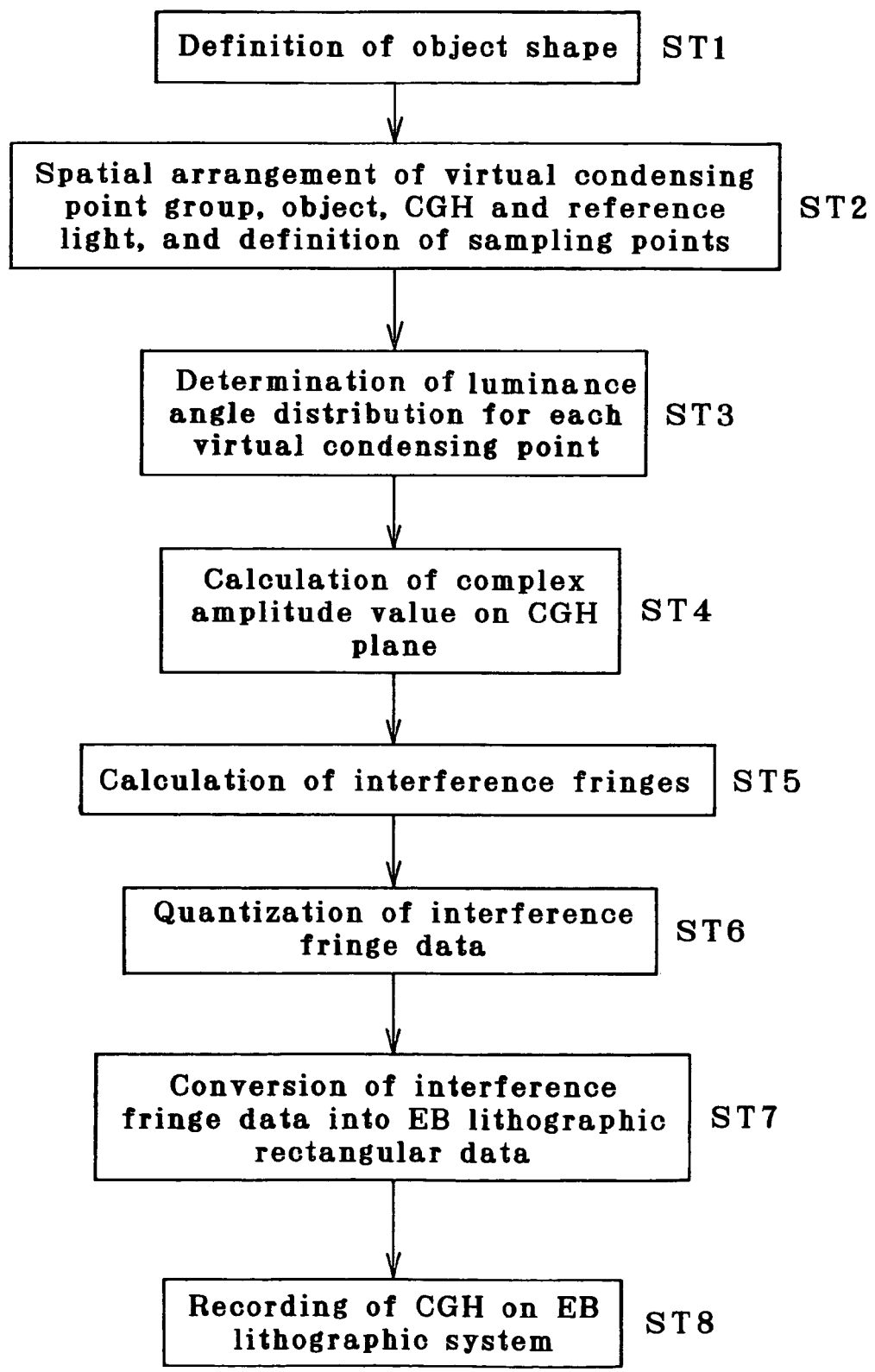
FIG. 6 is illustrative of how to fabricate the computer-generated hologram of FIG. 4.

How to fabricate such CGH 12 as explained with reference to FIGS. 4 and 5 in the form of a binary hologram is now explained with reference to FIG. 6. FIG. 6 is essentially similar to FIG. 3 with the exception that at step ST2, an arrangement of CGH 12, object 10, virtual condensing point group 13 and reference light 2, a sampling point ($P_j$) for CGH 12 and a sampling point ($Q_i$) for virtual condensing point group 13 are defined; at step ST3, the luminance angle distribution $T_{WLci}(\theta_{xz}, \theta_{yz})$ for each virtual condensing point is set in such a way as to become equal to that on the surface of object 10; and at step ST4, the complex amplitude value $O_{WLc}(x_2, y_2, z_2)$ of object light and the complex amplitude value $R_{WLc}(x_2, y_2, z_2)$ of reference light 2 on the plane of CGH 12 are calculated from equations (1') and (2), and so no further explanation is made herein.

In this embodiment, too, object waves incident on all virtual condensing points $Q_i$ are shown as being incident on the cell $P_j$ of CGH 12, it is understood that the virtual condensing point group 13 and CGH 12 could be divided to a number of slice planes vertical to the y-axis in such a way that the range of incidence of waves could be limited to within the slice planes.

In FIG. 4, while point light sources in a two-dimensional plane are used as the virtual condensing points, it is acceptable to employ line light sources emitting light that does not go as far as the y-direction.

In FIG. 4, the interference of object light and reference light is used so as to fix the complex amplitude value $O_{WLc}(x_2, y_2, z_2)$ as a hologram. However, it is acceptable to rely upon Lohmann's method and Lee's method (Non-Patent Publication 1) for direct reconstruction of the complex amplitudes of object waves, and the method proposed by the inventors in Patent Publication 9 as well.

The CGH 12 according to the invention has been described with reference to how to generate a stereoscopic image on the basis of the three-dimensionally shaped (3D CG) object 10 to be recorded; however, the invention is not limited thereto. For instance, if an image obtained by taking an image of a real object using a camera with a lens located at each virtual condensing point $Q_i$ and digitalizing that image, rather than a computer graphic image, is used as the distribution $T_{WLci}(\theta_{xz}, \theta_{yz})$ in the arrangement of FIG. 4, it is then possible to achieve a computer-generated hologram capable of reconstructing a stereoscopic image of that real image.

As an image is generated by gradual movement of a stereoscopic object for each variation of the position of virtual condensing points $Q_i$ (i.e., the position of a camera), it is possible to obtain an additional animation effect that enables a stereoscopic image to be viewed as if a stereoscopic image moved gradually with a variation in viewing position. This may be applied to the use of a computer graphic image or the case where an image of a real object is taken.

While this may also be applied to a conventional one-step holographic stereogram, it is understood that with the computer-generated hologram of the invention, it is possible to obtain ever higher resolution, because the CGH plane is so separated from the position of the group of virtual point light sources or virtual condensing points that the density of virtual point light sources or virtual condensing points can be increased, creating a reconstructed image having no distortion and improved quality.

While the computer-generated hologram of the invention has been described with reference to its principles, it should be understood that the invention is in no sense limited to the embodiments described so far and so many other modifications may be made.

In accordance with the computer-generated hologram of the invention, the position of condensing reconstruction light diffracted from the hologram is separated from the object to be reconstructed and the hologram plane. It is thus possible to achieve a computer-generated hologram that has no pixel structure on the hologram plane with much more parallaxes and ever higher resolution, creating a reconstructed image having no image distortion problem and much higher quality. It is also possible to provide a computer-generated hologram that makes any holographic photostep unnecessary, ensures simplified image processing, and makes a computer graphic image of a three-dimensional object obtained on commercial software available as the stereoscopic image to be recorded.

I claim:

1. A computer-generated hologram comprising:
    a plurality of cells,
    the hologram having information recorded therein, said information operable to recreate a stereoscopic image of an object,
    wherein at least one of said plurality of cells $P_j$ having information related to a luminance of a virtual point light source $Q_i$ from a plurality of virtual point light sources, the luminance corresponding to a point S on the object,
    the point S being on a straight line between said one of the plurality of cells $P_j$ and the virtual point light source $Q_i$,
    $Q_i$ being at a position away from the hologram plane and independent of S.

2. The computer-generated hologram according to claim 1, wherein a subset of the plurality of virtual point light sources together form a two-dimensional straight line light source.

3. A computer-generated hologram, the hologram separating a viewing side and a side opposite to the viewing side, the hologram comprising:
    a plurality of cells,
    the hologram having information recorded therein, said information operable to recreate a stereoscopic image of an object,
    the hologram being operable to receive reconstruction illumination light such that diffraction light is reconstructed,
    the diffraction light diverging from a plurality of virtual point light sources on the side of the hologram that is opposite to the viewing side;
    a luminance of the diffraction light from each virtual point being equal to a luminance of light from a corresponding point S on the object said luminance being measured in the hologram plane,
    the plurality of virtual point light sources being at a position away from the hologram plane and independently from the object.

4. The computer-generated hologram according to claim 3, wherein a subset of the plurality of virtual point light sources together form a two-dimensional straight line light source.

5. A computer-generated hologram, the hologram separating a viewing side and a side opposite to the viewing side, the hologram comprising:
   a plurality of cells,
   the hologram having information recorded therein, said information operable to recreate a stereoscopic image of an object,
   the hologram being operable to receive reconstruction illumination light such that diffraction light is reconstructed,
   the diffraction light converging on a plurality of virtual condensing points on the viewing side of the hologram;
   a luminance from each virtual point of the diffraction light being equal to a luminance of light from a corresponding point S on the object, the luminance being measured in the plane of the hologram
   the virtual condensing points being at a position away from the hologram plane and independently from the object.

6. The computer-generated hologram according to claim 5, wherein a subset of the plurality of condensing light points together form a two-dimensional straight line condensing light line.

7. A computer-generated hologram, the hologram separating a viewing side and a side opposite to the viewing side, the hologram comprising:
   a plurality of cells,
   the hologram having information recorded therein, said information operable to recreate a stereoscopic image of an object,
   the hologram being operable to receive reconstruction illumination light such that diffraction light is reconstructed,
   the diffraction light diverging from a plurality of virtual point light sources on the viewing side of the hologram;
   a luminance [$TWLci(\theta_{xy}, \theta_{yz})$] of the diffraction light from each of the virtual points being equal to a luminance of light from a corresponding point S on the object, the luminance being measured in the plane of the hologram,
   the plurality of virtual point light sources being at a position away from the hologram plane and independently from the object.

8. The computer-generated hologram according to claim 7, wherein a subset of the plurality of condensing light points together form a two-dimensional straight line condensing light line.

9. A method of generating a hologram capable of recreating a stereoscopic image of an object, the hologram separating a viewing side and a side opposite to the viewing side, the method comprising:
   creating a plurality of cells on the hologram, one of said plurality of cells being $P_j$;
   designating a plurality of virtual point light sources such that one of said plurality of virtual point light sources $Q_i$ corresponds to a point S on the object, the point S being on a straight line between $Q_i$ and $P_j$;
   generating a luminance of $Q_i$ such that the luminance corresponds to a luminance of S; and
   recording an information in the cell $P_j$ corresponding to the luminance
   the plurality of virtual point light sources being at a position away from the hologram plane and independently from the object.

10. The method of claim 9, wherein a subset of the plurality of virtual point light sources together form a two-dimensional straight line light source.

11. A method of generating a hologram capable of recreating a stereoscopic image of an object, the hologram separating a viewing side and a side opposite to the viewing side, the method comprising:
    designating a plurality of virtual point light sources on a side of the hologram opposite to a viewing side;
    producing diffraction light diverging from the plurality of virtual point light sources, the luminance of the diffraction light from each of the virtual points being equal to a luminance of light from a corresponding point S on the object, the luminance being measured in the plane of the hologram; and
    recording information on the hologram to recreate a stereoscopic image of the objects,
    the plurality of virtual point light sources being at a position away from the hologram plane and independently from the object.

12. The method of claim 11, wherein a subset of the plurality of virtual point light sources together form a two-dimensional straight line light source.

13. A method of generating a hologram capable of recreating a stereoscopic image of an object, the hologram having a viewing side and a side opposite to the viewing side, the method comprising:
    designating a plurality of condensing points of light on a viewing side of the hologram;
    producing diffraction light converging on the plurality of condensing points, the luminance of the diffraction light from each of a plurality virtual points being equal to a luminance of light from a corresponding point S on the object, the luminance being measured on the plane of the hologram; and
    recording information on the hologram to recreate a stereoscopic image of the object
    the virtual condensing points being at a position away from the hologram plane and independently from the object.

14. The method of claim 13, wherein a subset of the plurality of virtual point light sources together form a two-dimensional straight line light source.

* * * * *